July 28, 1942.　　　　F. L. WIESNER　　　　2,291,180
PORTABLE GRAIN BIN AND LOADER
Filed June 23, 1941　　　2 Sheets-Sheet 1
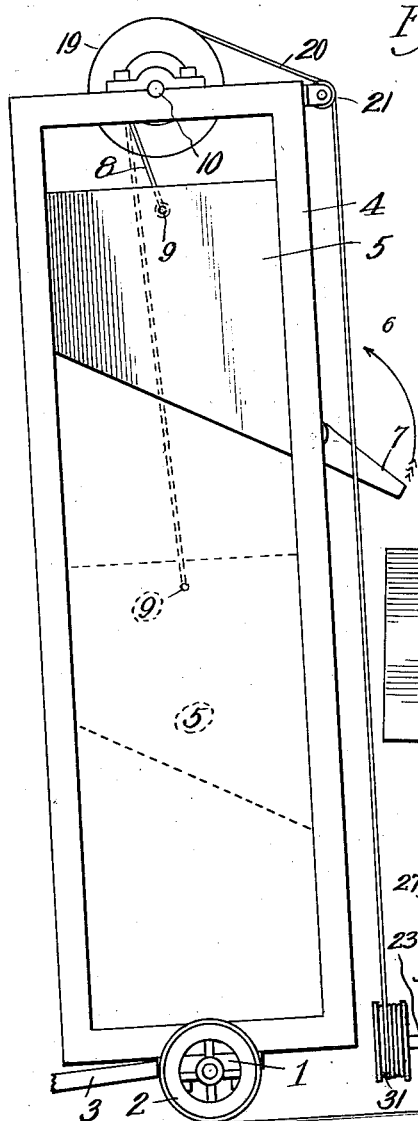
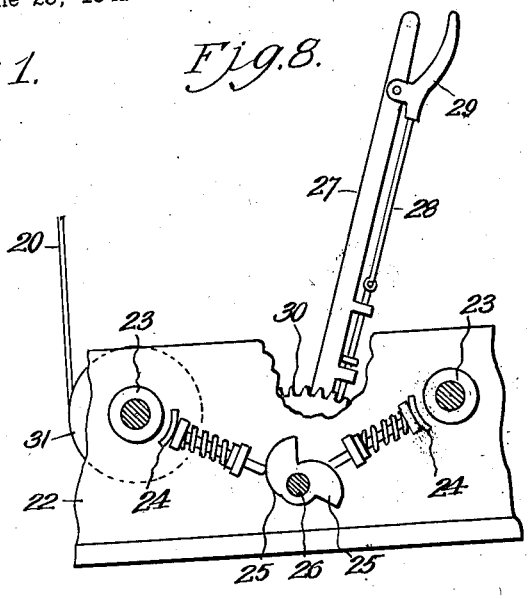
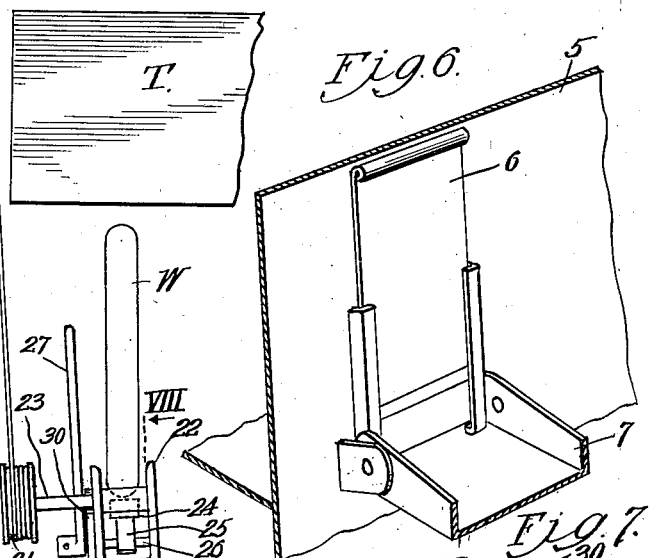
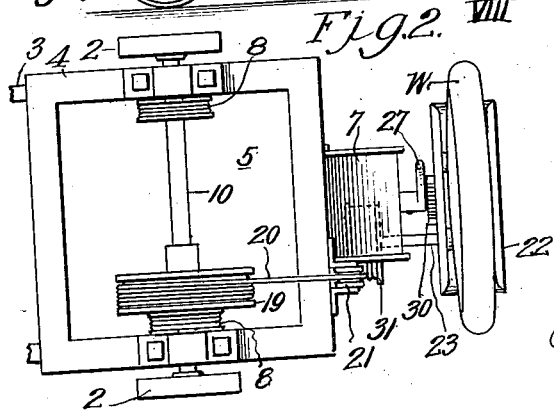
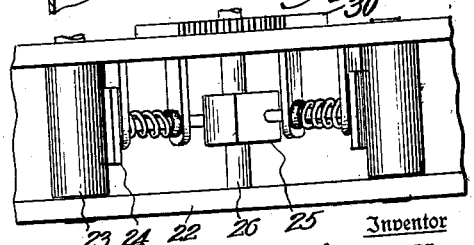
Inventor
Fred L. Wiesner
By Thorpe & Thorpe
Attorneys July 28, 1942.    F. L. WIESNER    2,291,180
PORTABLE GRAIN BIN AND LOADER
Filed June 23, 1941    2 Sheets-Sheet 2

Inventor
Fred L. Wiesner
By
Thorpe & Thorpe
Attorneys

Patented July 28, 1942

2,291,180

UNITED STATES PATENT OFFICE 2,291,180

PORTABLE GRAIN BIN AND LOADER

Fred L. Wiesner, Topeka, Kans.

Application June 23, 1941, Serial No. 399,406

6 Claims. (Cl. 214—119)

This invention relates to grain handling apparatus and is intended primarily for use in combination with a wheat harvesting combine and the automobile trucks or wagons employed to receive the threshed grain discharged from the combine storage tank. In the heading and threshing of wheat with a combine, it is frequently necessary to stop the combine on account of the fact that its tank is filled when there is no wagon or truck body ready to receive the load. This not only is inconvenient, but it delays the harvest. The prime object of the invention, therefore, is to provide temporary storage means for field use, so that under ordinary conditions there will always be a place for the combine to unload its tank without having to wait for the return of a truck or wagon.

Another object of the invention is to provide safety means in combination with a vertically elevated grain hopper, of such nature that there is but little danger of injury to the mechanism through carelessness in permitting the hopper to fall after it has discharged its load into a waiting wagon or truck.

A further object of the invention is to produce a structure of the general character mentioned which is mounted on a wheeled support for convenience in portability so that it can be hauled to and from the field and can be positioned at the most convenient point as desired, in relation to the operation of the combine.

A still further object of the invention is to provide a power take-off structure for use in discharging the grain in combination with the motive power of an automobile truck.

With the general objects named in view, and others as will hereinafter appear, the invention consists in certain novel and useful features of construction and organization of parts as hereinafter described and claimed; and in order that it may be fully understood, reference is to be had to the accompanying drawings, in which:

Figure 1 is a side elevation of a structure embodying the invention with parts broken away to disclose details otherwise hidden, and illustrating a truck in cooperative relation to the grain elevating or discharge apparatus.

Figure 2 is a top plan view of the structure with the grain receiving truck omitted, except for the drive wheel.

Figure 6 is a perspective view of a fragment of the hopper.

Figure 7 is an enlarged plan view of power transmitting mechanism more clearly shown than in Figure 1.

Figure 8 is a view on the same scale as Figure 7, taken on the line VIII—VIII of Figure 1.

Figure 3:
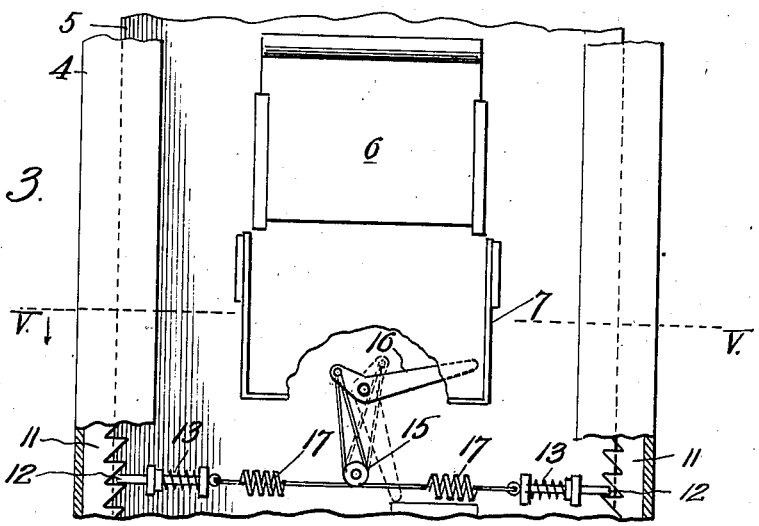
Figure 3 is an enlarged fragmental elevation disclosing the hopper and framework, in cooperative relation to the interlocking dog and ratchet mechanism for holding the hopper in elevated position.

In the said drawings, where like reference characters identify corresponding parts in all of the figures, 1 is a portable supporting structure which is preferably equipped with ground-engaging wheels 2 and a hitch or tow tongue 3 for convenience in moving the apparatus from place to place. Extending vertically upward from the support 1 is a skeleton framework 4 forming a guide or shaft for a grain receiving and discharging bin or hopper 5. By preference, the hopper 5 is formed to discharge through a discharge-opening on one wall which is normally closed by a manually operable gate 6. In the particular construction shown the discharge opening is provided with a pivoted discharge chute 7 which can be folded back to clear the parts and prevent accidental contact with a truck or combine, and can be unfolded or extended to operating position to discharge grain into a truck or wagon body, as will hereinafter appear.

In the form of apparatus here illustrated, the hopper 5 is mounted for vertical sliding movement within the framework, said hopper being elevated by one or more cables 8 (two being shown) attached at one end to a cross piece of the hopper and at their other ends to a winding shaft 10 journaled at the upper end of the framework 4. In the use of the structure the hopper is in its lowermost position when loaded by a combine or the like, in the absence of a truck or wagon body to receive the grain, as pointed out in the statement of the objects of the invention. When the truck or wagon returns to the field, the hopper contents are discharged therein.

To accomplish this result, any suitable means may be employed to elevate the hopper a sufficient distance so that its chute 7 may overlie the wagon or truck body. In view of the fact that various types of apparatus may be adapted to elevate the grain, it is found necessary to provide means to hold the hopper in its elevated position regardless of whether or not power is still being applied to retain the hopper in its elevated position. For example, the shaft 10 might be equipped with dog and ratchet holding means, but it is preferred to apply the safety lock (dog and ratchet) between the hopper 5 and the framework 4 because by this means, the hopper will be held even though the elevating cables 8 may break. It is preferred, therefore, to attach one or more vertically extending ratchet bars 11 to the framework 4, the hopper 5 having dogs 12 advanced by springs 13 into cooperative engagement with the ratchet teeth as the hopper is elevated toward the top of the framework. With such construction it will be apparent that the hopper will be held in any position of vertical adjustment upon relaxation of tension or pull on the cables 8. The dogs 12 must be withdrawn or retracted to permit of gravitative descent of the hopper. In the preferred construction, as hereinafter described, these dogs are so operated that they cannot be withdrawn to permit the hopper to descend, unless the weight of the hopper is being sustained by the cables 8.

In the form of construction shown, each of the dogs 12 has its rear end secured to the outer end of one of a pair of flexible or linkage connectors 14, said connectors being in guided contact with sheaves 15 journaled on the hopper. The inner ends of the connectors 14 are attached to one arm of a bell crank lever 16, the other arm of said lever being adapted to be manually swung, as will hereinafter appear, between full and dotted line positions shown in the drawings (see Figure 4). The connectors 14 are made yieldingly extensible in any suitable manner as by insertion of springs 17 which, when tensioned, exert a pull on the dogs 12 to retract or withdraw the same from the ratchet bars 11 against the resistance of the advancing spring 13. The comparative tension of springs 17 and 13 is such, that the former cannot overcome the latter as long as any of the weight of the hopper 5 is resting on the dogs 12. Thus, the arrangement is such that the dogs 12 can never be withdrawn from the ratchets 11 except when the elevating cables 8 are supporting the hopper 5, and presumptively the operator is ready to govern the reverse rotation of the shaft 10 to regulate the speed of gravitative return of the hopper 5.

At the commencement of operation, the bell crank lever 16 stands in the full line position (Figure 3), at which time the springs 17 exert no tension against the springs 13. Consequently during the upward travel of the hopper 5, the dogs 12 will ride over the teeth of the ratchet bars 11 ready to hold the hopper against downward movement should the pull on the elevating cables 8 be relaxed from any cause. When the hopper 5 reaches its top position (shown in Figure 3), the preferred mode of operation is to relax the lifting cables 8 to transfer the load from the cables to the dogs 12, although, of course, the cable tension can be maintained, if desired, so that the dogs never take any of the load although they will be in position ready to take such load. However, regardless of whether or not the dogs 12 have taken the load, it will be evident that as long as the lever 16 stays in its full line position (Figure 3), the dogs 12 will be advanced into the ratchet bars 11 and it will be impossible to lower the hopper.

In either event, while the hopper is in its elevated position, the operator manually throws bell crank lever 16 from its full to its dotted line position (Figure 3). This action throws the cable-connected arm of lever 16 past center and tensions the springs 17, and if no part of the weight of the hopper 5 is resting on said dogs 12, the force of tensioned springs 17 overcomes the resistance of the spring 13 and withdraws the dogs 12 from the ratchet bars 11. On the other hand, if the hopper weight is resting on the dogs 12, throwing the bell crank lever merely tensions spring 17 and will not withdraw the dogs 12, but on a retensioning of the cables 8 by a slight upward lift of the hopper 5, said dogs will be automatically withdrawn by said springs 17, as will be readily understood. Thus, in both methods of operation the cables 8 must be sustaining the load before the dogs can be withdrawn, and the accidental fall of the hopper is reliably prevented.

Figure 4:
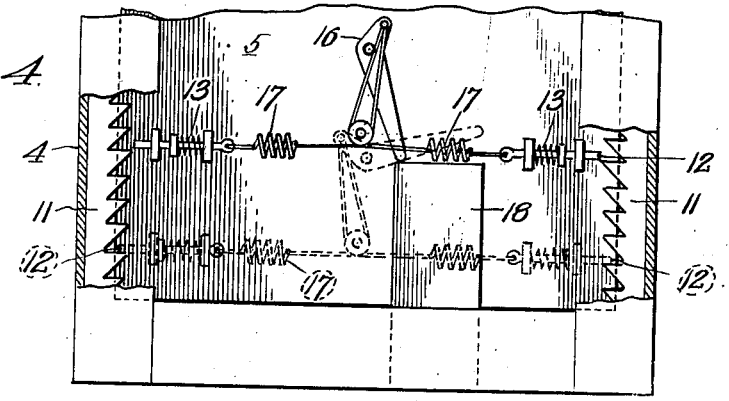
Figure 4 is a view similar to Figure 3, but illustrating the hopper in its lower position, the wheeled support being omitted.
Figure 5:
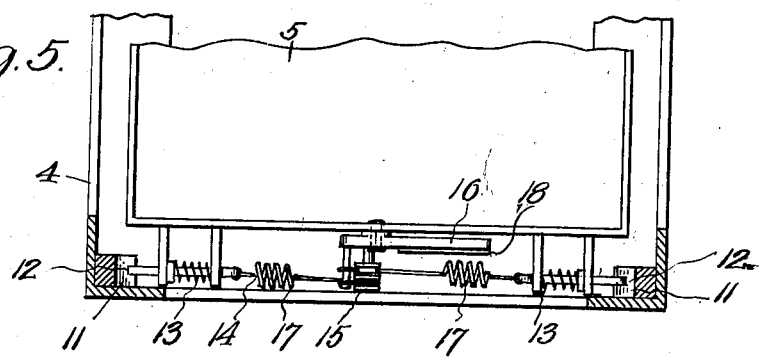
Figure 5 is a horizontal section on the line V—V of Figure 3.

To overcome human deficiencies, it is preferred to automatically restore the ratchet and dog to interlocking position when the hopper 5 is returned to its lower position, and to accomplish such result, a stop plate 18 projects from the framework 4 in position to intercept the course of travel of the handle arm of the crank lever 16 in the downward movement of the hopper (see Figures 4 and 5). Continued downward movement of the hopper after the handle arm has contacted the stop plate 18, rotates the bell crank lever backward until the end of the other lever arm passes center, when the bell crank, as a whole, is restored to full line position by the action of the retractile springs 17. This operation permits springs 13 to again project the dogs 12 into cooperative engagement with the ratchet bars 11 ready for the reelevation of the hopper 5.

As heretofore mentioned, although any suitable apparatus may be used to rotate the elevating shaft 10, the preferred method comprises keying a drum 19 to the shaft, said drum being encircled by a winding elevating cable 20. The free end of the cable extends from the drum over guide sheaves 21 carried by the framework. Any power or manual mechanism may be used to pull on the cable 20, as by attaching the end of the cable to the tail gate or axle of a truck, to a combine, or the like, to effect elevation of the hopper. In the preferred arrangement, however, in order to insure that a grain receiving truck is in position to receive the grain discharged from the hopper, immediately it attains its elevated position, the wheeled support may be combined with a ground engaging power or bull-wheel having a winding drum to which the cable 20 is attached. With this arrangement a suitable hitch is made to the grain receiving truck and when the hopper support is pulled forwardly, the grain hopper is simultaneously elevated for discharge into the truck. However, as a substitute, the following arrangement is preferred:

22 is a suitable ground-engaging support in which a pair of parallel rolls 23 are journaled for engagement with one of the driven wheels W of a motor truck T. This power device may be placed in any suitable position and anchored to the ground, and a dirt ramp or pit can be provided if necessary. With this construction it will be apparent that when one of the driven wheels W is resting on the rolls 23, power applied to the rear truck axle will drive said wheel and the truck will remain stationary through the action of its differential as long as the resistance offered by the rolls 23 is less than the resistance of the ground-engaging wheel of the truck. When the truck is loaded and it is desired to drive it off, any suitable brake mechanism may be provided to lock the rolls 23 against rotation, as by providing the rolls with a pair of brake shoes 24 which can be advanced against the rolls by cams 25 on a shaft 26 journaled in the support 22. Keyed to one end of the shaft 26 is a manually operable lever 27 having a spring-advanced latching pin 28 controlled by a pivoted handle 29 so that it may be advanced into or withdrawn from any of a series of locking holes in a sector 30, rigid with the support.

The shaft of one of the rolls 23 constitutes the power shaft, and it is extended outside of the support 22 at one side, where it is equipped with a cable winding drum 31 receiving the cable 20. With this arrangement, the cable 20 may be wound back and forth between drums 19 and 31 to elevate and permit the lowering of the hopper. After the truck has been loaded and has passed off the rolls 23, the bearing support 22 for said rolls, being ground-anchored against the weight of the empty hopper 5, makes it possible for the operator to govern the gravitative speed of return of the hopper through manipulation of the brake control lever 27. Of course, the truck can be used to brake the return of the hopper, if desired.

From the above description it will be apparent that I have produced a structure embodying all of the features of advantage set forth as desirable, and while I have described and illustrated the preferred embodiment, it is to be understood that I reserve the right to all changes within the spirit and scope of the appended claims.

I claim:

1. In grain handling apparatus, a wheeled support, a vertical framework carried by said support, a ratchet bar carried by the frame, a hopper vertically slidable within the framework, a spring-advanced dog on said hopper for engagement with the ratchet to hold the hopper in elevated position, a shaft journaled at the upper end of the framework, a cable secured at its opposite ends to the shaft and hopper, a pair of winding drums, one on said shaft and the other in fixed relation to the support, a second cable having its opposite ends attached to said drums, means to rotate the second cable, a lever pivoted to the hopper, a tensible connection from the lever to the dog adapted to be tensioned by movement of the lever beyond center in one direction, and a stop to trip the lever in the opposite direction when the hopper is in its lowermost position.

2. In grain handling apparatus, a wheeled support, a vertical framework carried by said support, a ratchet bar carried by the frame, a hopper vertically slidable within the framework, a spring-advanced dog on said hopper for engagement with the ratchet to hold the hopper in elevated position, a shaft journaled at the upper end of the framework, a cable secured at its opposite ends to the shaft and hopper, a pair of winding drums, one on said shaft and the other in fixed relation to the support, a second cable having its opposite ends attached to said drums, means to rotate the second drum, a lever pivoted to the hopper, a tensible connection from the lever to the dog adapted to be tensioned by movement of the lever beyond center in one direction, a stop to trip the lever in the opposite direction when the hopper is in its lowermost position, and a brake on said second drum to control gravitative descent of said hopper.

3. In hoist apparatus, a vertical framework, a winding drum rotatably mounted at the upper end of said framework, a hopper for vertical movement in the framework, a winding cable encircling the drum and attached to the hopper, dog and ratchet mechanism in engagement during the elevation of the hopper to hold the hopper in case it tends to accidentally descend, said dog and ratchet mechanism including a pair of yieldingly actuated elements pulling in opposed relation, and a lever for tensioning one of said yielding elements to exert a pulling force greater than that of the opposed element.

4. In hoist apparatus, a vertical framework, a winding drum rotatably mounted at the upper end of said framework, a hopper for vertical movement in the framework, a winding cable encircling the drum and attached to the hopper, dog and ratchet mechanism in engagement during the elevation of the hopper to hold the hopper in case it tends to accidentally descend, said dog and ratchet mechanism including a pair of yieldingly actuated elements pulling in opposed relation, a lever for tensioning one of said yielding elements to exert a pulling force greater than that of the opposed element, and a stop to trip said lever to relieve the preponderating tension of the tensioned element when the hopper reaches a predetermined position in its travel.

5. In hoist apparatus, a vertical framework, a winding drum rotatably mounted at the upper end of the framework, a hopper for vertical movement in the framework, a winding cable encircling the drum and attached to the hopper, dog and ratchet mechanism in engagement during the elevation of the hopper to hold the hopper in case it tends to accidentally descend, said dog and ratchet mechanism including a pair of springs pulling in opposed relation, and a lever for tensioning one of said springs to exert a pulling force greater than that of the other spring.

6. In hoist apparatus, a vertical framework, a winding drum rotatably mounted at the upper end of the framework, a hopper for vertical movement in the framework, a winding cable encircling the drum and attached to the hopper, dog and ratchet mechanism in engagement during the elevation of the hopper to hold the hopper in case it tends to accidentally descend, said dog and ratchet mechanism including a pair of springs pulling in opposed relation, a lever for tensioning one of said springs to exert a pulling force greater than that of the other spring, and a stop to trip said lever to relieve the preponderating spring tension when the hopper reaches a predetermined position in its travel.

FRED L. WIESNER.